No. 87,684.   PATENTED MAR. 9, 1869.
C. L. LARDER.
BRUSH HANDLE.
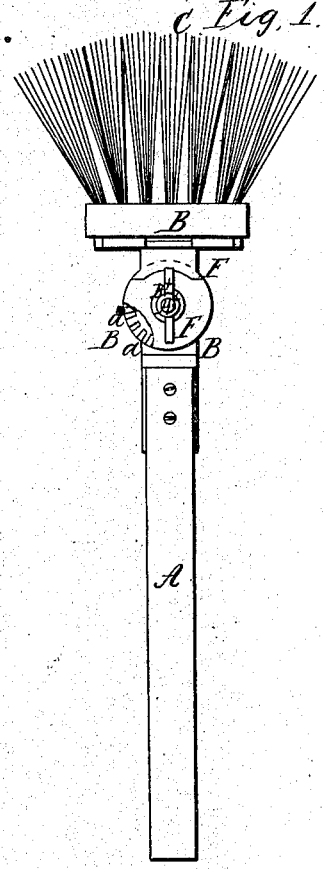
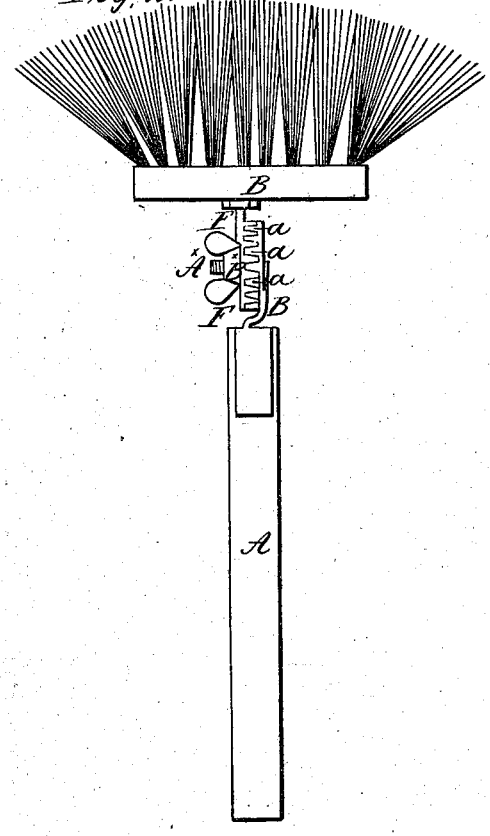
Witnesses
J W Coomby
A Lellere
Inventor,
C L Larder
pr Brown Coomby & Co
Attorney

CHRISTOPHER L. LARDER, OF BROOKLYN, NEW YORK.

Letters Patent No. 87,684, dated March 9, 1869.

IMPROVED BRUSH-HANDLE.

The Schedule referred to in these Letters Patent and making part of the same.

*To all whom it may concern:*

Be it known that I, CHRISTOPHER L. LARDER, of Brooklyn, in the county of Kings, and State of New York, have invented a new and useful Improvement in Means of Attaching Handles to Brushes; and I do hereby declare that the following is a full, clear, and exact description of the same, reference being had to the accompanying drawings, making a portion of this specification, in which—

Figure 1 is a side view of a brush made according to my invention.

Figure 2 is a side view and partial section of the same, taken at right angles to fig. 1.

Figures 3 and 4 are detached views, indicating certain modifications of the same.

Similar letters of reference indicate corresponding parts in all the figures.

This invention relates to that variety of brushes which have their heads made adjustable at different angles to their handles, as is desirable in scrubbing or cleaning walls, windows, ceilings, and the like.

The invention consists in so combining two interlocking plates, and a tightening-screw and nut, with the brush-head, and the staff, or handle, of the same, that the head may be readily adjusted, and firmly secured at any desired angle to the staff, or handle, in such manner that paint, whitewash, or other pigment will not penetrate, to clog the interlocking parts.

To enable others to understand the nature and construction of my invention, I will proceed to describe it with reference to the drawings.

A represents the staff, or handle of the brush, to one end of which, in a position longitudinal thereto, is firmly secured a metallic plate, B, upon one side of which is formed a circular series of spurs, or teeth, $a'$, pointing radially inward; the plate B being furthermore provided, at the same side with its teeth $a'$, with a cylindrical-threaded spur, or screw, A*, having upon its outer end a nut, B*, and the purpose of which will presently herein appear.

The brush-head B' may be of rectangular or other suitable form, with the bristles C arranged thereon in any appropriate manner.

Secured to the back of the head B', in a position at right angles thereto, is a metallic plate, F, upon one side of which is a circular series of spurs, or teeth, $b$, pointing radially outward, and corresponding to the teeth $a'$ of the plate B. The two plates being placed together, with the teeth of one situated in the spaces between the teeth of the other, with the screw A* passed through a suitable hole provided in the plate F, at the centre of its circular series of teeth $b$, just described, the nut B* is screwed upon the screw A*, tightly against the plate F, and by clamping the plates, interlocked, as it were, by their teeth, $a'$ $b$, snugly together, insures the retention of the head in a fixed position upon the staff or handle, and the peripheries of the plates B and F fitting closely together, exclude the pigment from the teeth, and prevent them from becoming clogged.

In order to change the angle of the head with reference to the staff, or handle, it is only necessary to unscrew the nut B*, so that the teeth on one plate may be brought clear of those on the other, which being done, the head is turned around the axis of the screw A* until brought to the required angle, and is then fixed thereat by simply tightening the nut upon the screw, as hereinbefore explained.

What I claim as my invention, and desire to secure by Letters Patent, is—

The plates B F, constructed, the one with internal and the other with external radial teeth, fitting one within the other, and clamped together, in such manner as to exclude the paint or other pigment from said teeth, substantially as set forth.

In testimony whereof, I have hereunto set my hand and affixed my seal, in the presence of two attesting witnesses.

CHRISTOPHER L. LARDER. [L. S.]

Witnesses:
A. LE CLERC,
HENRY T. BROWN.